(12) United States Patent
Clarke et al.

(10) Patent No.: US 8,468,037 B1
(45) Date of Patent: Jun. 18, 2013

(54) REINSURANCE RISK MANAGEMENT

(75) Inventors: Geoffrey Clarke, Foster City, CA (US);
Kenneth William Branson, Los Altos, CA (US); Minh Vu, Milpitas, CA (US)

(73) Assignee: Guidewire Software, Inc., Foster City, CA (US)

( * ) Notice: Subject to any disclaimer, the term of this patent is extended or adjusted under 35 U.S.C. 154(b) by 0 days.

(21) Appl. No.: 13/432,788

(22) Filed: Mar. 28, 2012

(51) Int. Cl.
*G06Q 40/08* (2006.01)
(52) U.S. Cl.
USPC .......................................................... 705/4
(58) Field of Classification Search
USPC ............................................................ 704/4
See application file for complete search history.

(56) References Cited

U.S. PATENT DOCUMENTS

| | | | |
|---|---|---|---|
| 8,090,600 B2 * | 1/2012 | Ziade et al. | 705/4 |
| 2004/0103012 A1 * | 5/2004 | Nussbaum et al. | 705/4 |
| 2008/0065556 A1 * | 3/2008 | Best-Devereux | 705/80 |
| 2008/0167905 A1 * | 7/2008 | Bredl et al. | 705/4 |
| 2008/0288295 A1 * | 11/2008 | Caballero et al. | 705/4 |
| 2011/0125537 A1 * | 5/2011 | Reynolds et al. | 705/4 |
| 2011/0153368 A1 * | 6/2011 | Pierre et al. | 705/4 |
| 2013/0035964 A1 * | 2/2013 | Roscoe et al. | 705/4 |

* cited by examiner

*Primary Examiner* — Jagdish Patel
(74) *Attorney, Agent, or Firm* — Van Pelt, Yi & James LLP

(57) ABSTRACT

Managing risks associated with reinsurance includes: obtaining a plurality of insurance policies, each of the plurality of insurance policies comprising a plurality of coverages; identifying, for each insurance policy in the plurality of insurance policies, a set of coverages that corresponds to a geographical location, a policy level liability, or a covered item; and evaluating, for each identified set of coverages, a corresponding reinsurable risk, the evaluation includes determining a total insured value associated with the corresponding reinsurable risk.

26 Claims, 11 Drawing Sheets

REINSURANCE RISK MANAGEMENT

BACKGROUND OF THE INVENTION

Reinsurance is a way for insurance companies to manage and spread risks. It is considered as insurance for the insurance company. Typically, an insurance company (referred to as the carrier) directly sells insurance policies to its customers. It reinsures its liability by ceding business with other companies (referred to as reinsurers). In other words, the carrier and the reinsurers share revenues and potential risks of having to pay claims, particularly claims caused by a single catastrophe (e.g., a major fire, a flood) according to some agreement (referred to as a reinsurance program).

For example, a reinsurance program can be entered into that specifies that, for a single loss event associated with a set of buildings, the carrier is responsible for the first $1 million in property damage claims, a first reinsurer is responsible for the next $4 million in property damage claims, and a second reinsurer is responsible for the next $5 million in property damage claims. This way, the set of buildings is covered by a reinsurance program of $10 million in property damage claims. As used herein, a single loss event refers to a single catastrophic event that can result in a total loss, such as a large scale natural disaster such as a fire or a tornado.

The complexity of reinsurance programs can expose the carrier to a potentially large downside. For example, with a $10 million reinsurance program, if the carrier unwittingly underwrites a $10 million policy for the building owner, and $2 million each for 5 tenants in the buildings, should a fire destroy all the buildings, the total loss would be $20 million, exceeding the limits of the reinsurance program by $10 million. The carrier alone would have to pay the excess to the insured. Since large carriers must manage a great number of policies and reinsurance programs, problems with inadequate reinsurance can be difficult to detect. Further, currently it is difficult for carriers to ascertain actual exposures across a large number of policies. Thus, an automated, scalable, and reliable way of managing reinsurance programs and insurance policies is needed.

BRIEF DESCRIPTION OF THE DRAWINGS

Various embodiments of the invention are disclosed in the following detailed description and the accompanying drawings.

FIGS. 10 and 11 are functional diagrams illustrating embodiments of user interfaces configured to display reinsurable risks by geographical proximity.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system and method for managing risks associated with reinsurance are disclosed. In some embodiments, coverage sets that correspond to the same geographical location, the same policy level liability, or the same covered item are automatically identified. For each coverage set, a corresponding reinsurable risk and its total insured value are automatically evaluated. In some embodiments, reinsurable risks that are potentially subject to a single loss event are identified and used to calculate a combined total insured value. Both the individual total insured value and the combined total insured value can be compared with the coverage provided by a reinsurance program to determine whether there is adequate reinsurance coverage. In some embodiments, corrective actions are permitted or required in the event that inadequate reinsurance coverage is identified.

Figure 1:
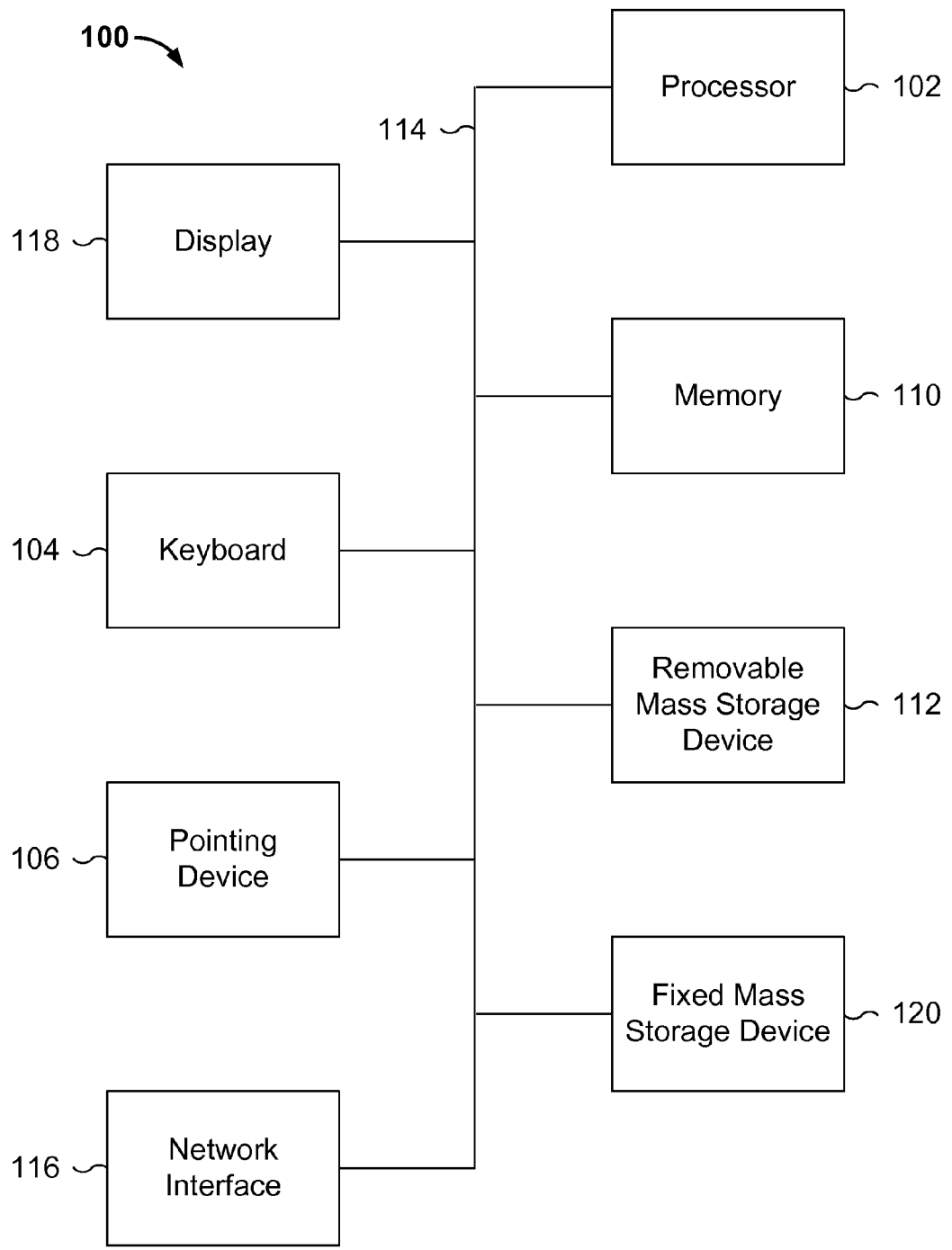
FIG. 1 is a functional diagram illustrating a programmed computer system for managing risks relating to reinsurance in accordance with some embodiments.

FIG. 1 is a functional diagram illustrating a programmed computer system for managing risks relating to reinsurance in accordance with some embodiments. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 is used to perform reinsurance risk management processes such as processes described below in connection with FIGS. 5, 7, and 8.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage device 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
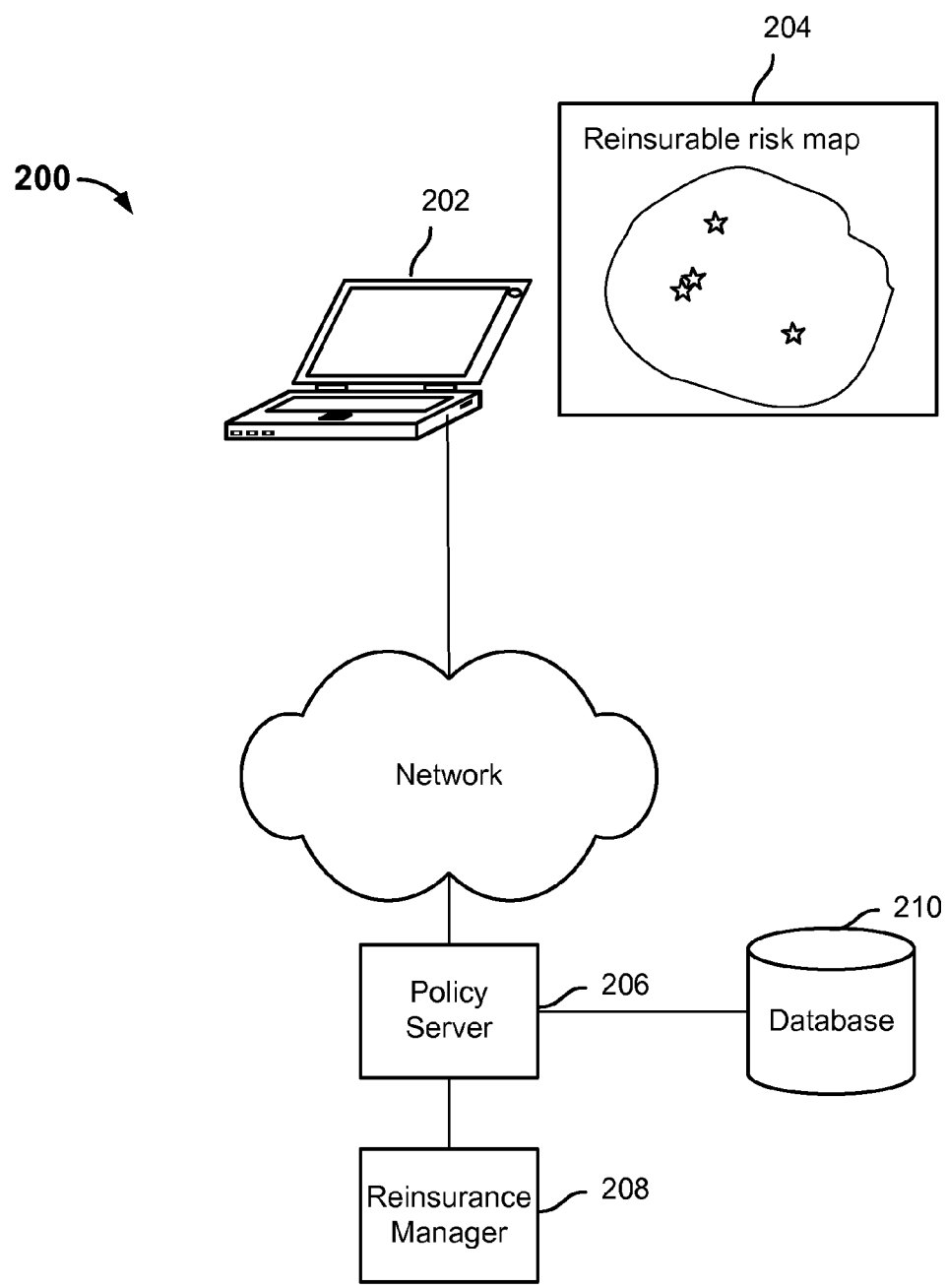
FIG. 2 is a system diagram illustrating an embodiment of a reinsurance risk management system.

FIG. 2 is a system diagram illustrating an embodiment of a reinsurance risk management system. In this example, a client device 202 communicates with a management platform via a network. Examples of device 202 include a laptop computer, a desktop computer, a smart phone, a mobile device, a tablet device or any other computing device. As shown, device 202 is configured to communicate with the policy management platform, which includes policy server 206, reinsurance manager 208, and database 210. In various embodiments, an application such as a web browser or a client application is installed at device 202 to enable communication with the platform. In some embodiments, one or more user interfaces (e.g., interface 204) are provided to allow a user (e.g., an administrator of the insurance policy) to review and modify reinsurance related information. In this example, policy server 206 has logic for handling policy management, including generating quotes for insurance policies, updating policies, and binding policies. Insurance policy information and reinsurance program information are stored in database 210. The reinsurance policy manager cooperates with the policy server to make determinations about reinsurable risks and their associated reinsurance programs, and present results to the user. Other configurations are possible. For example, in some embodiments, the policy server and the reinsurance manager are combined into a single device.

Figure 3:
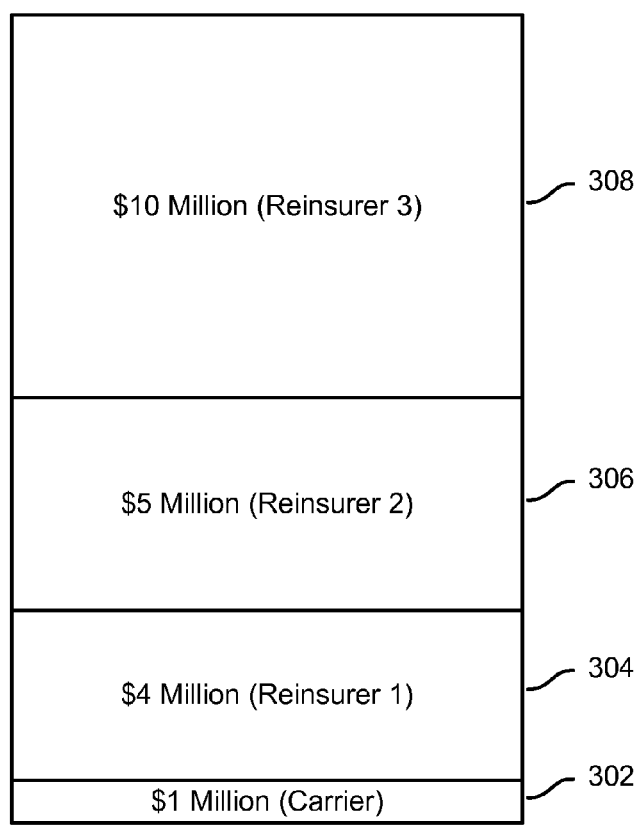
FIG. 3 is a functional diagram illustrating an example of a reinsurance program.

FIG. 3 is a functional diagram illustrating an example of a reinsurance program. In this example, a $20 million reinsurance program covering a single loss event is divided into multiple layers. The carrier is responsible for the first layer, 302, which covers $1 million in losses. In other words, if the total amount of damage claims from a single loss event is under $1 million, the carrier is solely responsible for paying out the claims. By establishing the reinsurance program, it is the carrier's intention that its maximum exposure to a single loss event should not exceed this amount. Thus, this amount is sometimes referred to as the target net retention of the reinsurance program. Reinsurer 1 is responsible for the next layer, 304, which covers the next $4 million in losses. Thus, if the total amount of loss exceeds $1 million but is under $5 million, the carrier pays out the first $1 million and the remaining is paid out by reinsurer 1. Similarly, reinsurers 2 and 3 are responsible for layers 306 (the next $5 million in losses) and 308 (the next $10 million in losses), respectively.

Once a reinsurance program is established, its corresponding data structure is stored in memory or in a database such as 210. A plurality of reinsurance programs can be established and stored.

In addition to the layer information, attributes associated with the reinsurance program are stored in some embodiments. Examples of the attributes include location information (e.g., a particular geographical region such as the state to which the reinsurance program applies), reinsurance coverage group, and date information (e.g., the effective period of the reinsurance program). In particular, the reinsurance coverage group specifies the type of coverages to which the reinsurance program applies. For example, the reinsurance coverage group of a reinsurance program for commercial property includes coverages for the building structure, contents, loss of use, business interruptions, etc.

Figure 4:
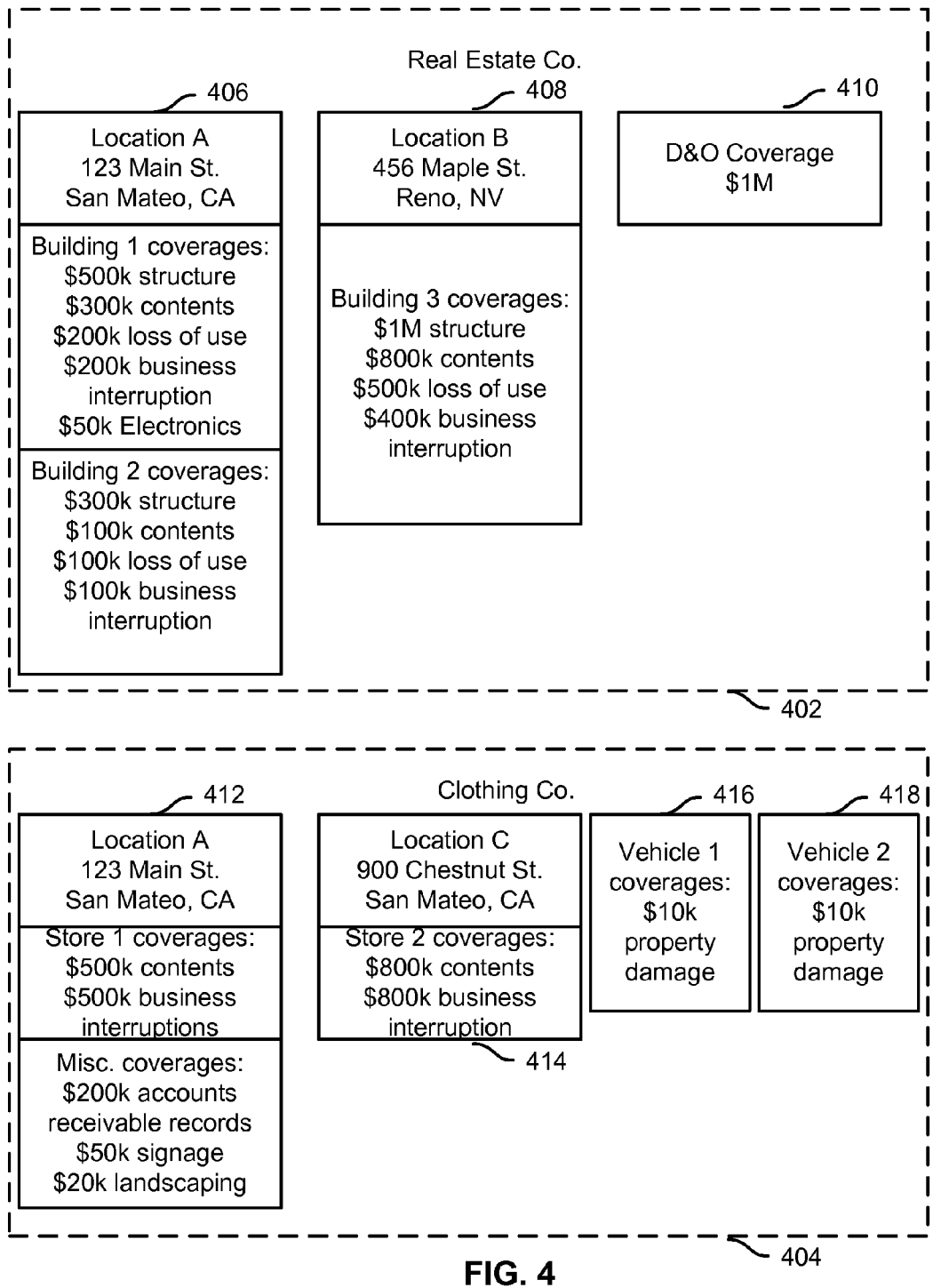
FIG. 4 is a functional diagram illustrating several examples of insurance policies.

FIG. 4 is a functional diagram illustrating several examples of insurance policies. Each policy provides a number of coverages. As used herein, a coverage refers to an obligation to pay for damages that are caused by a particular peril (or collection of perils). The obligation typically has corresponding financial limits and deductibles that circumscribe the insurer's responsibility for losses against that coverage.

In this example, a real estate company owns insurance policy 402. Some of the coverages are location specific, such as coverages for two buildings at location A (406) ("123 Main St., San Mateo, Calif.") and one building at location B (408) ("456 Maple St., Reno, Nev."). For Building 1, the coverages include $500,000 in the building's structure, $300,000 in contents, $200,000 in loss of use, $200,000 in business interruption, and an electronic sublimit of $50,000. For Building 2, the coverages include $300,000 in structure, $100,000 in contents, $100,000 in loss of use, and $100,000 in business interruption. For Building 3, the coverages include $1 million in structure, $800,000 in contents, $500,000 in loss of use, and $400,000 in business interruption. Although address-based location information is illustrated in this example, other location information formats such as latitude/longitude can be used. In addition, policy 402 includes non-location specific coverages, in this case, $1 million in liability coverage for directors and officers (410) (referred to as a "D&O" coverage).

Also shown in this example, a clothing company owns policy 404. Policy 404 provides coverages to a store at location A (412), including $500,000 in contents and $500,000 in business interruption. It also provides coverages to a different store at location C (414) ("900 Chestnut St., San Mateo, Calif."), including $800,000 in contents and $800,000 in business interruption. Policy 404 further provides a number of miscellaneous coverages at location A (412), including $200,000 in accounts receivable records, $50,000 in signage, and $20,000 in landscaping. In addition, the policy also provides coverages for specific items such as vehicles 1 (416) and 2 (418), where each vehicle has $10,000 of property damage coverage. Since vehicles are mobile, their coverages are considered to be non-location specific.

Figure 5:
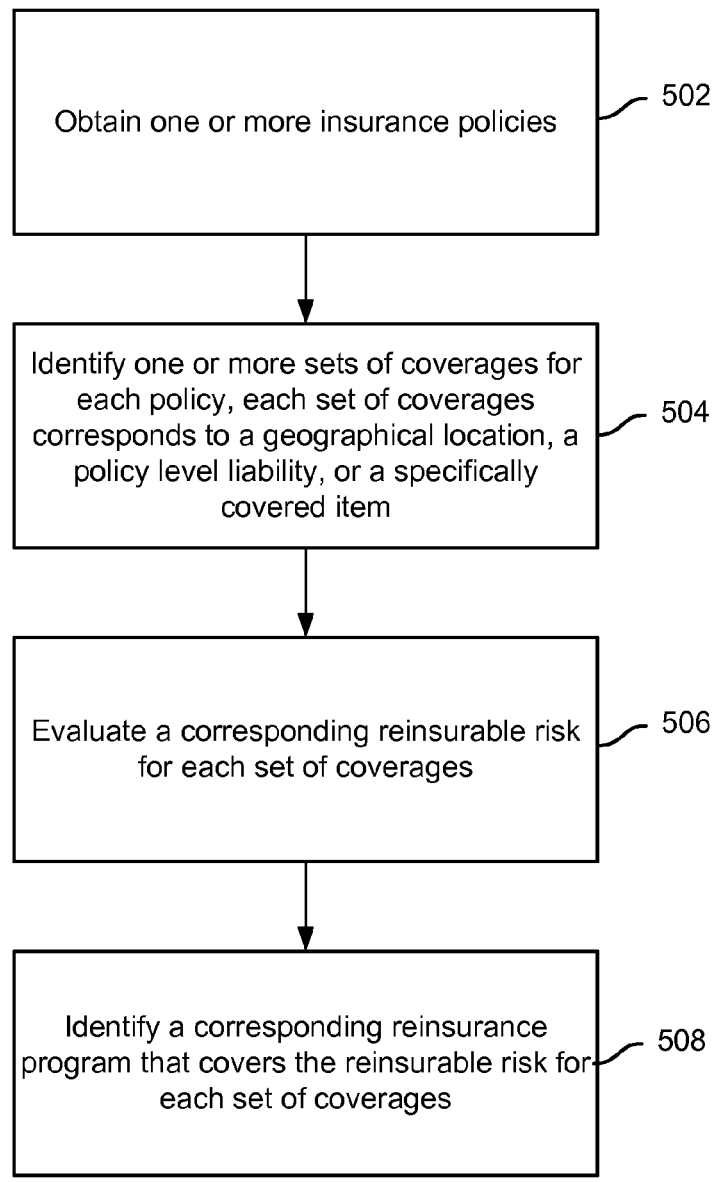
FIG. 5 is a flowchart illustrating an embodiment of a process for managing risks associated with reinsurance.

In some embodiments, reinsurable risks and their respective total insured values associated with the policies are determined. Based on the determination, the carrier can determine the adequacy of its own reinsurance programs, assess its exposure in a certain geographical area, make decisions about whether to underwrite certain policies, etc. FIG. 5 is a flowchart illustrating an embodiment of a process for managing risks associated with reinsurance. Process 500 may be performed on a system such as 100.

At 502, one or more insurance policies (e.g., policies 402 or 404) are obtained.

At 504, one or more sets of coverages are identified for each of the obtained policies. Each set of coverages corresponds to a geographical location, a policy level liability, or a specifically covered item.

At 506, for each set of coverages, a corresponding reinsurable risk is evaluated. The evaluation includes determining a total insured value that is associated with the corresponding reinsurable risk. As used herein, the total insured value corresponds to the maximum amount of loss covered by the set of coverages. Details of the determination are discussed below in FIG. 6.

Optionally, at 508, for each set of coverages, a corresponding reinsurance program that covers the reinsurable risk is identified. As will be described in greater detail below, criteria such as geographical location, effective dates, the type of coverages are used to identify, among the plurality of reinsurance programs, the appropriate one for the reinsurable risk.

Figure 6:
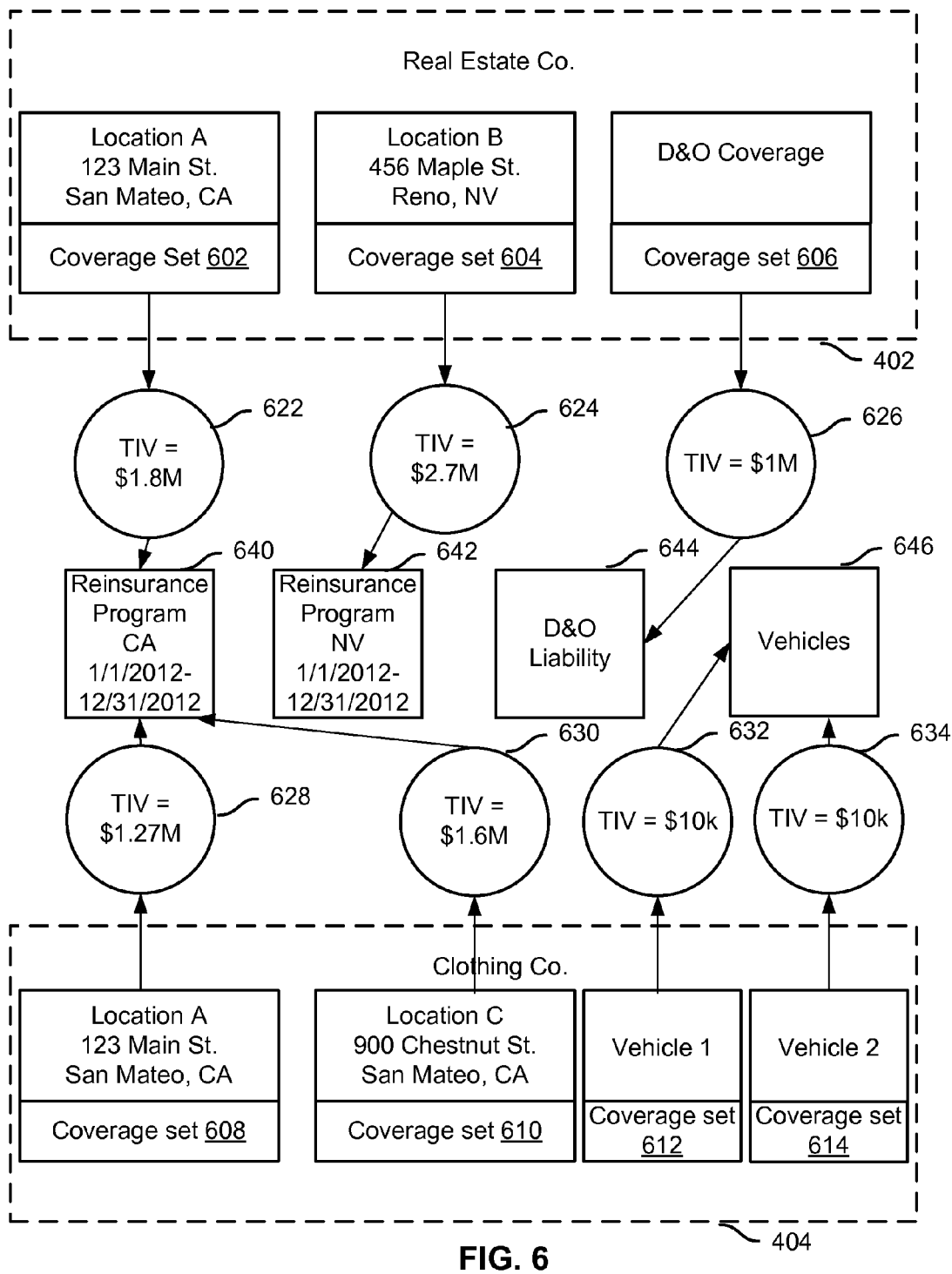
FIG. 6 is a diagram illustrating the determination of the reinsurance risks and their respective total insured values (TIV's) according to one example.

FIG. 6 is a diagram illustrating the determination of the reinsurance risks and their respective total insured values (TIV's) according to one example. Coverage sets 602-614 are determined based on policies 402 and 404 of FIG. 4, based on whether the coverage is for a property at a location, for policy level liability, or for a covered item. In this example, based on policy 402, the coverages pertaining to buildings 1 and 2 at location A are grouped as coverage set 602; the coverages pertaining to building 3 at location B are grouped as coverage set 604; and the coverages pertaining to D&O liability (which is a policy level liability) are grouped as coverage set 606. Based on policy 404, the coverages pertaining to location A, including coverages to store 1 and miscellaneous coverages (accounts receivable records, signs, and landscaping) are grouped as coverage set 608; the coverages pertaining to store 2 at location C are grouped as coverage set 610; the property damage coverages pertaining to vehicles 1 and 2 (which are specifically covered items) are grouped as coverage set 612.

For each set of coverages, a corresponding reinsurable risk is established. In some embodiments, the evaluation includes calculating the total insured value for each reinsurable risk. The total insured value accounts for any overlaps in coverage. In some cases, the coverages are independent and can be added together to generate the total insured value. For example, the total insured values for coverage sets 604-614 are the sums of their respective coverages minus any coverage overlaps. For example, in coverage set 602, in addition to structure, contents, loss of use, and business interruption coverages, there is an electronic sublimit of $50,000. In the event of a total loss, there would not be an additional payout of $50,000 in electronics; instead, the loss would be included in the contents coverage of $300,000. As such, the total insured value for coverage set 602 is $500,000 (structure, building 1)+$300,000 (contents, building 1)+$200,000 (loss of use, building 1)+$200,000 (business interruption, building 1)+$300,000 (structure, building 2)+$100,000 (contents, building 2)+$100,000 (loss of use, building 2)+$100,000 (business interruption, building 2)=$1.8 million.

In some embodiments, the total insured value corresponds to a probable maximum loss rather than an absolute maximum loss. For example, a large farm has several buildings at the same address but are miles apart. The likelihood that they will all be destroyed in one event such as a big fire is exceedingly small. Thus, the probable maximum loss corresponds to the maximum loss that may incur should the most valuable of the buildings be destroyed completely. In some embodiments, the administrator can override the automatically calculated total insured value and replace it with the probable maximum loss to more realistically reflect the maximum amount of loss the carrier is subject to in case of a single loss event.

The reinsurance program is identified for each reinsurable risk. In some embodiments, the identification is made by matching properties of the reinsurable risk with properties of a reinsurance program according to criteria such as geographical location, effective dates, reinsurance coverage group, etc. A match is found if the coverages of the reinsurable risks are included in the coverages of a reinsurance program, and that the effective period of the coverages is included in the effective period of the reinsurance program. In this example, reinsurance program 640 provides coverage for property damage in California between Jan. 1, 2012-Dec. 31, 2012, and reinsurance program 642 provides coverage for property damage in Nevada between Jan. 1, 2012-Dec. 31, 2012. Reinsurance program 644 provides coverage for D&O liability anywhere, and reinsurance program 646 provides coverage for vehicles. Thus, the matching process determines that the coverages of reinsurable risks 622, 628, and 630 correspond to reinsurance program 640 because the location, the effective period, and the type of coverage all match. Further, in this example, reinsurable risk 624 is found to correspond to reinsurance program 642; reinsurable risk 626 corresponds to reinsurance program 644; and reinsurable risks 632 and 634 correspond to reinsurance program 646.

Figure 7:
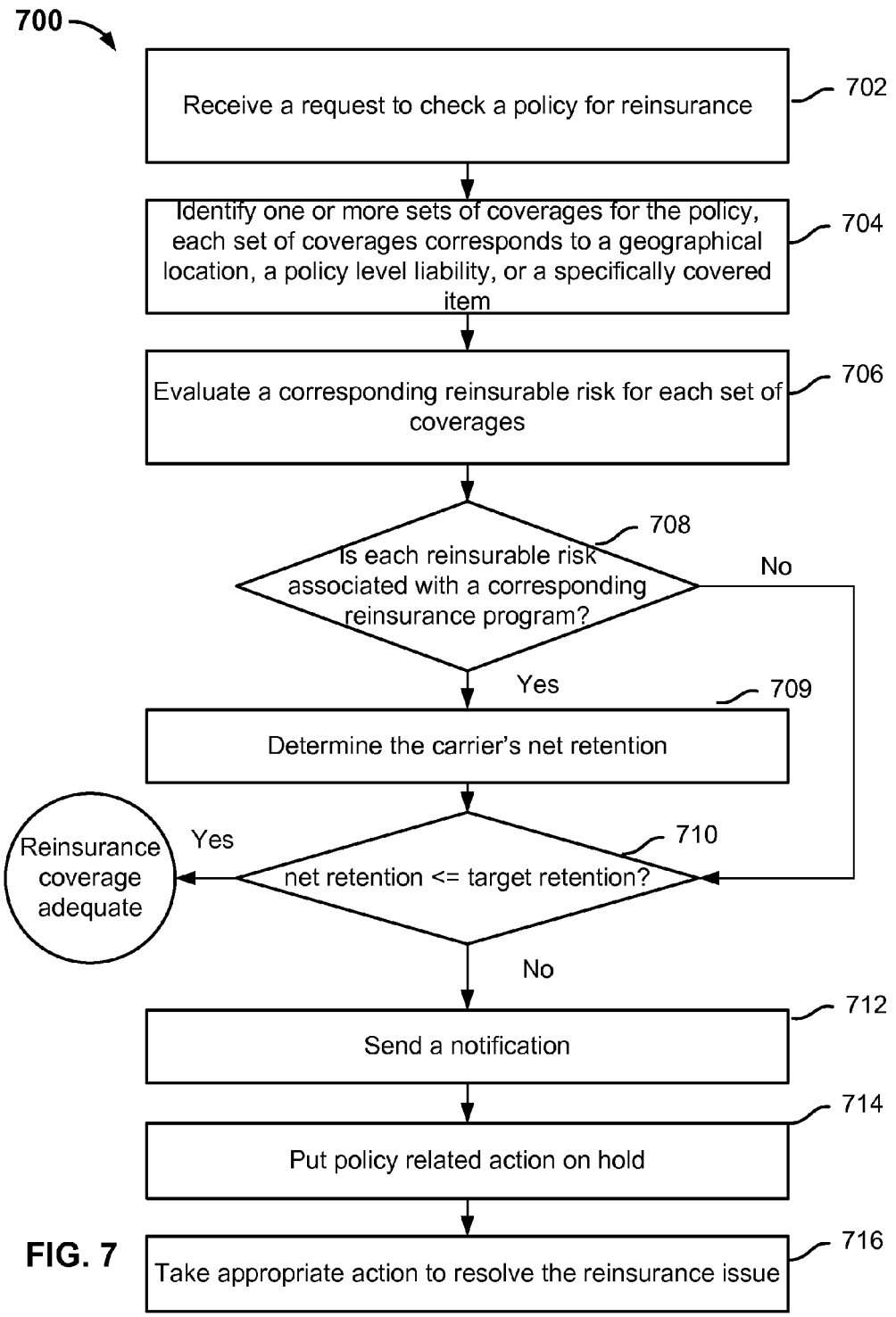
FIG. 7 is a flowchart illustrating an embodiment of a use case where the adequacy of reinsurance coverage is determined.

In some embodiments, the result of the reinsurance risks and their associated total insured values are used to determine whether the individual policies have adequate reinsurance coverage. FIG. 7 is a flowchart illustrating an embodiment of a use case where the adequacy of reinsurance coverage is determined. Process 700 may be performed on a system such as 100. The process initiates at 702, when a request to check a policy for reinsurance is received. In some embodiments, the request is made by one part of the system (such as a policy generation/renewal engine) and received by another part of the system (such as a reinsurance engine) when a new policy needs to be bound or when an existing policy needs to be renewed. 704-706 are similar to 504-506 of process 500. At 708, it is determined whether each reinsurable risk is associated with a corresponding reinsurance program. If yes, at 709, the carrier's net retention (i.e., the amount of risk not ceded to the reinsurers) is determined. At 710, the net retention is compared with the reinsurance program's target net retention to determine if the reinsurance coverage is adequate. If the net retention is less than or equal to the target retention, the reinsurance risk is deemed to have adequate reinsurance coverage. If no matching reinsurance program is found for a set of coverages, or if the carrier's net retention exceeds the target net retention specified by the reinsurance program, at 712, a notification (e.g., an alert) is optionally sent to the user indicating that the risks are not sufficiently reinsured. At 714, a policy related action (e.g., binding the policy, renewing the policy, or updating the policy) is put on hold and prevented from proceeding until the issue is resolved. In some embodiments, any user interface and logic associated with the policy related action is temporarily disabled to put the policy related action on hold. At 716, an appropriate action is taken to resolve the reinsurance issue. For example, the particular reinsurance risk may be exempt or excluded from any reinsurance program, a facultative reinsurance treaty may be placed to provide a specific coverage for the reinsurable risk, the total insured value may be overrode with a probable maximum loss that is more reasonable, etc. 708-716 can be repeated until all the reinsurable risks are processed.

Figure 8:
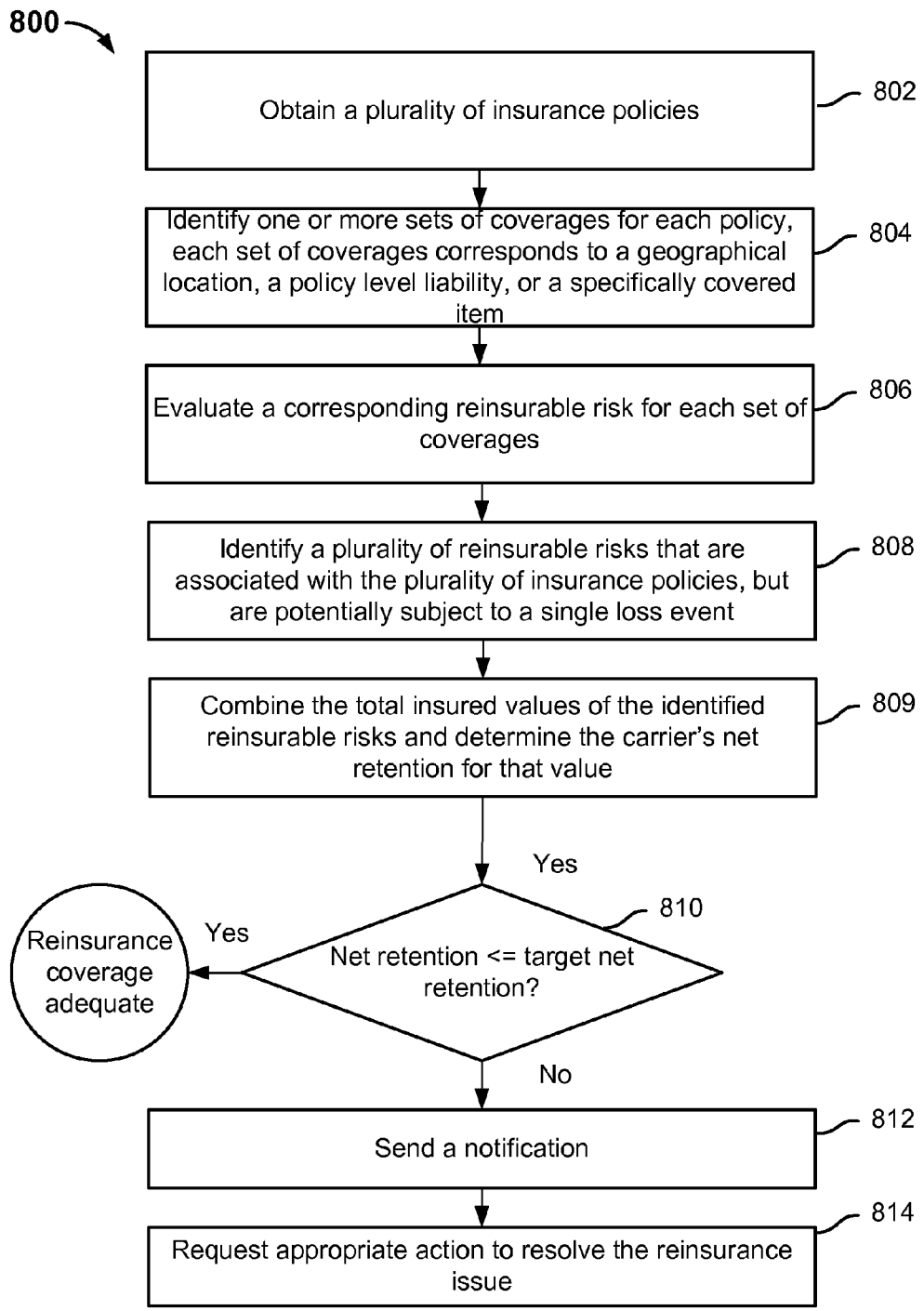
FIG. 8 is a flowchart illustrating an embodiment of a process for managing reinsurance using combined risks.

In general, a reinsurance program is structured to cover losses due to a single risk. Multiple policies can contain reinsurable risks that are subject to a single loss event. For example, several businesses located in the same building may have separate insurance policies with the same insurance carrier. In the event of a big fire, all the businesses can be totally destroyed, and the carrier would want the reinsurance program to cover any payout exceeding their target net retention. Thus, in some embodiments, reinsurable risks across multiple policies are combined to form a combined risk, which can be used for checking exposure, adequacy of reinsurance coverage, etc. FIG. 8 is a flowchart illustrating an embodiment of a process for managing reinsurance using combined risks. Process 800 may be performed on a system such as 100.

802-806 are similar to 502-506 of FIG. 5. At 802, a plurality of insurance policies (e.g., any of the policies 402-414) are obtained. At 804, one or more sets of coverages are identified for each of the obtained policies, where each set of coverages corresponds to a geographical location, a policy level liability, or a specifically covered item. At 806, for each set of coverages, a corresponding reinsurable risk associated with a reinsurance program is evaluated.

At 808, a plurality of reinsurable risks associated with the plurality of policies and potentially subject to a single loss event covered by a reinsurance program is identified. The single loss event can be a single localized loss event (e.g., a fire that would affect a certain geographical area) or a single activity related loss event (e.g., a defective ingredient that would lead to liability by all manufacturers that use it). In some embodiments, the identification is made by automatically filtering on one or more of the following attributes of the reinsurable risks: effective date, location (in particular, proximity in location), type of coverages (also referred to as reinsurance coverage group), and line of business. Policy information is compared with the specified filtering criteria to identify the appropriate group of reinsurable risks.

Many different criteria can be used for determining the grouping of reinsurable risks. For example, terrain or other types of geographical information can be used in addition to location information. For instance, although two buildings are adjacent to each other, because they are separated by a river and therefore unlikely to be damaged by the same fire, their reinsurable risks are not combined. In some embodiments, the identification is made by the user. The reinsurable risks are geocoded (e.g., encoded with latitude and longitude), and a user interface displays the locations of the reinsurable risks on an interactive map that affords the user with the ability to zoom and select reinsurable risks that should be combined. The determination is made by the user via the user interface that displays the locations of the reinsurable risks on a map and provides the user with the ability to select specific risks to form a combined risk.

In some embodiments, in addition to effective dates and distance, other criteria for determining whether reinsurable risks are subject to a single loss event (such as a common risk factor) can be used. For example, a reinsurance program for reinsuring product liability coverage to a number of manufacturers would be triggered if a single ingredient used in their product were tampered with, a shared portion of their supply chains were disrupted, etc.

The combined total insured value can be used in a number of ways. Steps 809-816 illustrate one use case.

At 809, the total insured values of the plurality of identified reinsurable risks are combined, the carrier's net retention for that value is determined. At 810, the carrier's net retention is compared with the target net retention of the reinsurance program. If the carrier's net retention does not exceed the target net retention of the reinsurance program, the reinsurance risks are deemed to have adequate reinsurance coverage. Otherwise, the reinsurance risks are deemed to be insufficiently covered by the reinsurance program.

Refer to FIG. 3 for an example where the target retention provided by the reinsurance program is $1 million and the total amount provided by the reinsurance program is $20 million. Suppose that the total insured values results in a combined value of $25 million. Accordingly, the carrier is subject to a net retention of $6 million (i.e., $1 million for any risk under $20 million as specified by the reinsurance program, $5 million for any risk above $20 million), which exceeds the target net retention and indicates inadequate coverage by the reinsurance program.

At 812, an alert or notification is optionally sent to the user indicating that the risks are not sufficiently reinsured. The alert/notification can include explanations of the single loss event and how much the combined total insured value exceeds the reinsurance program. At 814, appropriate actions to resolve the reinsurance issue are requested. Examples of appropriate actions include exempting these reinsurable risks from the reinsurable program, placing facultative reinsurance treaties to add coverage for these risks, and overriding the combined total insured value with a smaller but more probable maximum loss.

There can be multiple sets of such reinsurable risks covered by the same reinsurance program (e.g., two sets of reinsurable risks that are potentially subject to two different loss events). Steps 808-814 can be repeated for each set of reinsurable risks.

810-814 illustrate one way to use the information about the reinsurable risks that are potentially subject to a single loss event. Many other uses are possible. For example, a user can specify a particular area, and the combined total insured value of reinsurable risks within the area is computed and presented to the user so he can determine the adequacy of reinsurance coverage in the area. As another example, the user can review how concentrated the risks are in order to determine whether to underwrite additional policies in the same area, or to understand the effects a catastrophe such as a fire or storm may have on an area. In another example, the user can specify a certain amount of reinsured value (e.g., $2 million), and the program will retrieve specific reinsurable risks that add up to that amount to present to the user.

Figure 9:
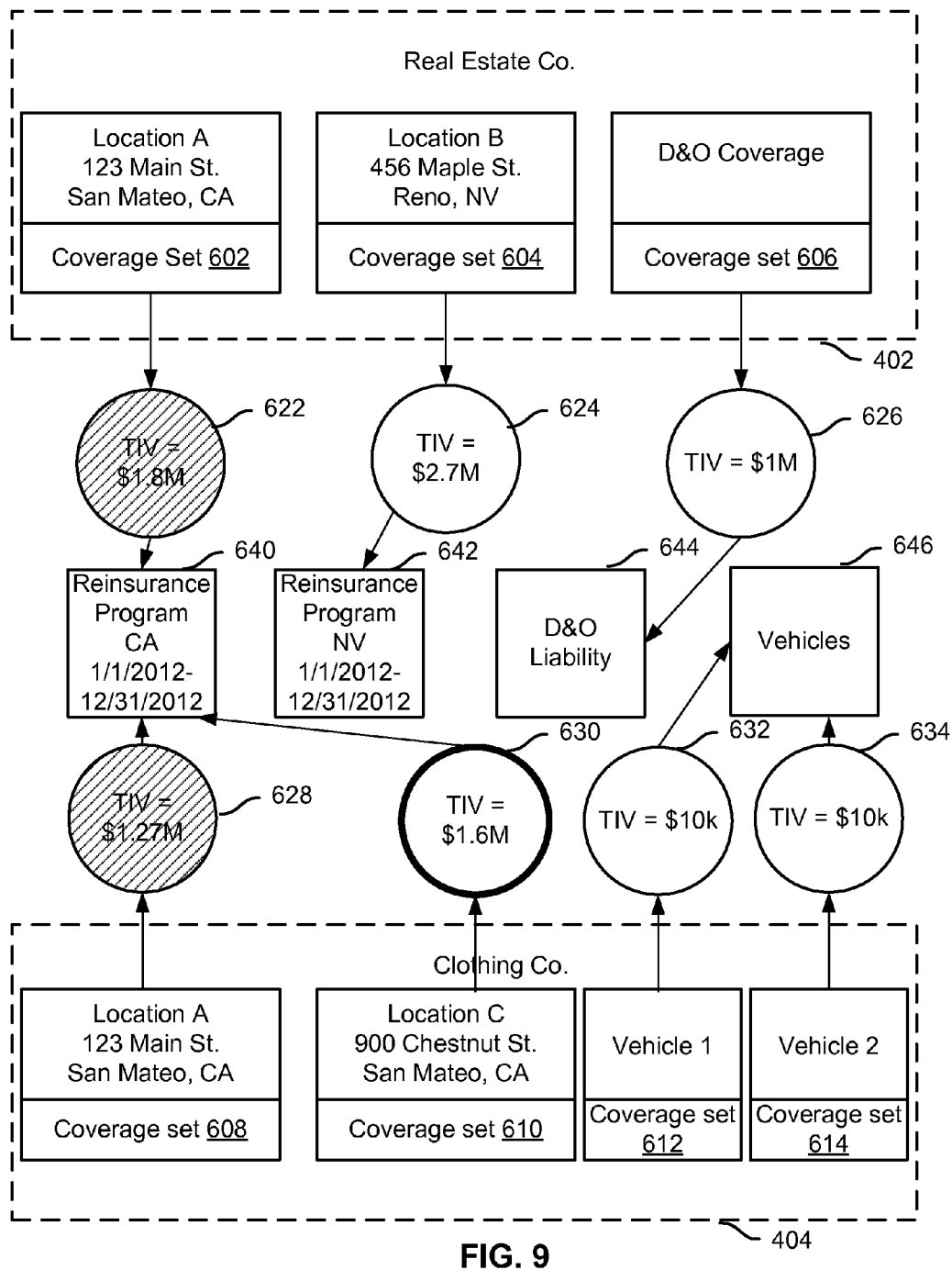
FIG. 9 is a functional diagram illustrating the determination of combined risks according to one example.

FIG. 9 is a functional diagram illustrating the determination of combined risks according to one example. The coverages, individual insurable risks, and reinsurance programs shown in this example are the same as those shown in FIG. 6. In this example, individual reinsurable risks that are potentially subject to a single loss event are identified and combined into a single combined risk. The identification is based on location proximity, the reinsurance program that correspond to the reinsurable risks, and the effective dates. Other criteria may be used in other embodiments. For the date range of Mar. 1, 2012-Jun. 30, 2012, policies 402 and 404 are both in effect. During this time, reinsurable risks 622 and 628 are combinable because they correspond to coverages that are in proximity (at the same location A) and that are covered by the same reinsurance program. Depending on how proximity is defined, reinsurable risk 630 can also be combinable with reinsurance risks 622 and 628. For example, the system or the user can specify that buildings within a certain distance to each other are potentially subject to a single loss event (such as fire). If locations A and C are within this distance, risk 630 is combined with risks 622 and 628; otherwise, risk 630 is not combined with risks 622 and 628.

Figure 10:
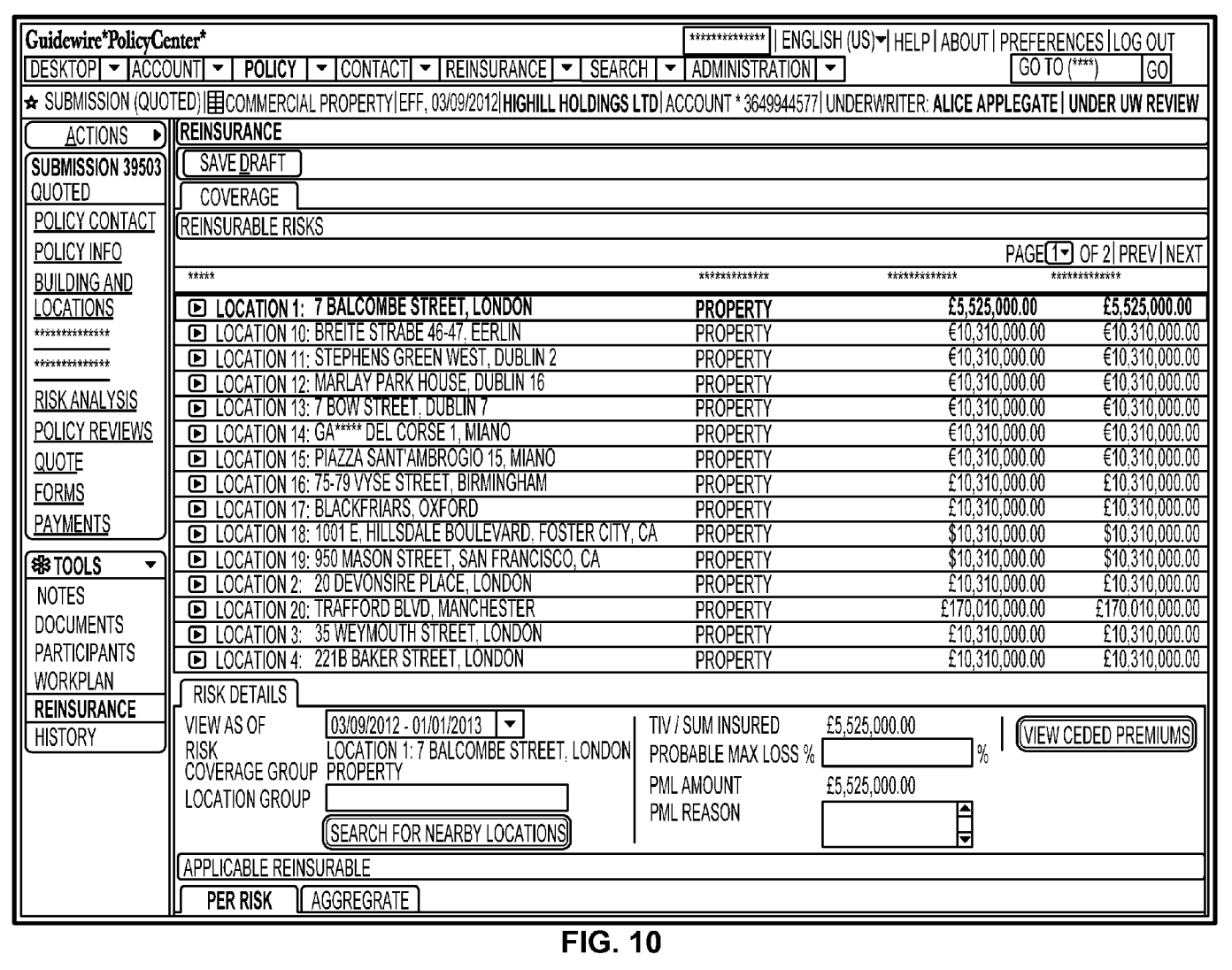
Figure 11:
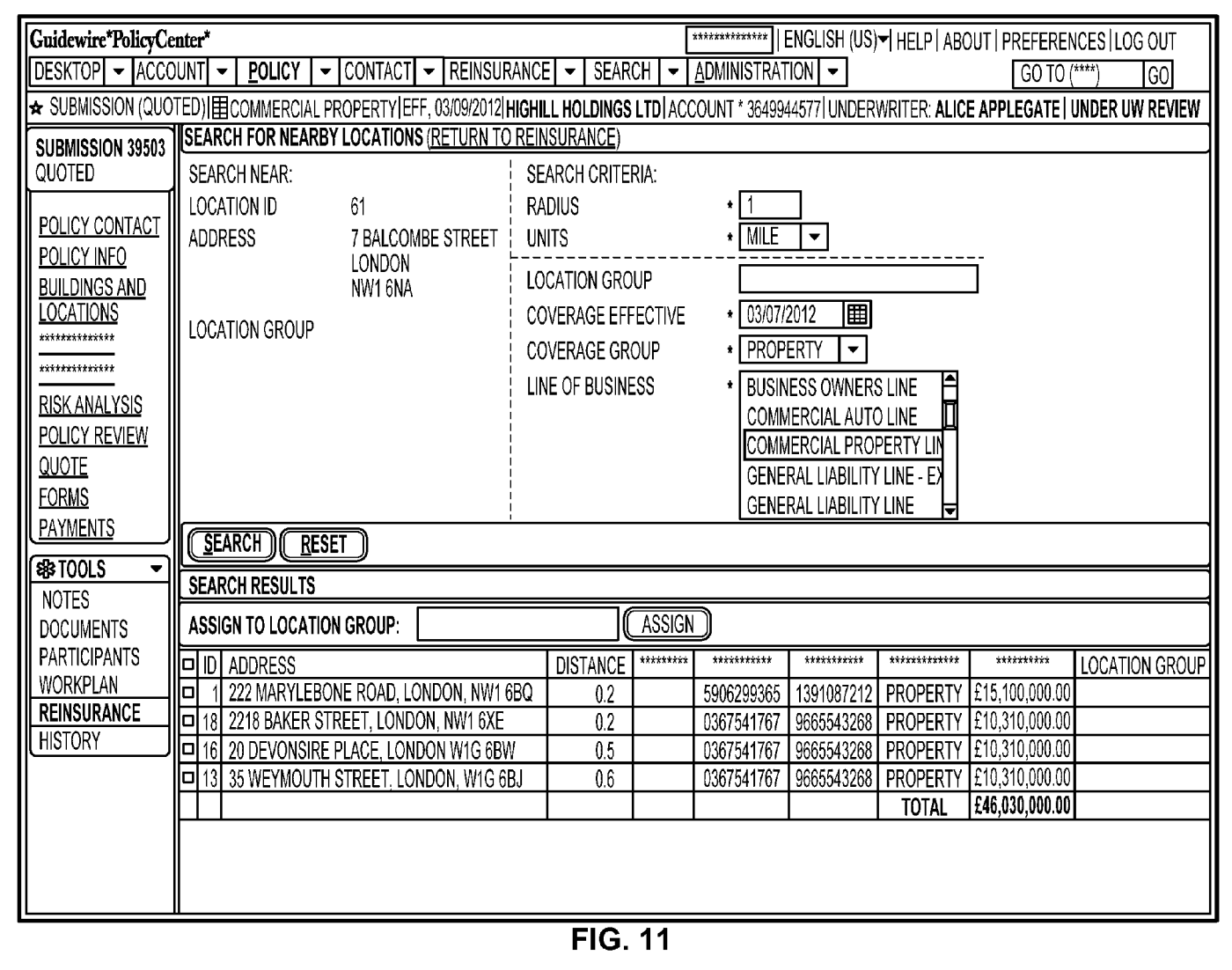

FIGS. 10 and 11 are functional diagrams illustrating embodiments of user interfaces configured to display reinsurable risks by geographical proximity. In FIG. 10, a list of reinsurable risks of a policy is displayed. The user is presented with the option to select a specific reinsurable risk, and click on the "Search for Nearby Locations" button to invoke a function that searches, across all policies in the system, additional reinsurable risks that are nearby. Configuration options for search criteria such as the radius of the area being searched, the units used (e.g., miles, kilometers), the effective date of the coverage, the coverage group, and the line of business are presented. The user can specify different search criteria and perform search by selecting the "search" button. The system searches the list of reinsurable risks and displays the ones meeting the search criteria in FIG. 11. In some embodiments, the user is allowed to select specific ones of the total insured value of the search results. The system computes the sum of the total insured values and presents it to the user so he can judge whether these risks have adequate reinsurance coverage, whether to make adjustments to the reinsurance program, or take other appropriate action.

Managing risks associated with reinsurance has been disclosed. Techniques disclosed herein allow insurance carriers to more easily determine whether risks they underwrite are adequately reinsured, thus preventing themselves from unwittingly being exposed to large amounts of losses due to a single catastrophic event.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing risks associated with reinsurance, comprising:
   one or more processors configured to:
      obtain a plurality of insurance policies, each of the plurality of insurance policies comprising a plurality of coverages;
      identify, for each insurance policy in the plurality of insurance policies, a set of coverages that corresponds to a geographical location, a policy level liability, or a covered item; and
      evaluate, for each identified set of coverages, a corresponding reinsurable risk, the evaluation includes determining a total insured value associated with the corresponding reinsurable risk; and
   one or more memories coupled to the one or more processors, configured to provide the one or more processors with instructions.

2. The system of claim 1, wherein the one or more processors are further configured to identify, for each reinsurable risk, a corresponding reinsurance program that covers the reinsurable risk.

3. The system of claim 2, wherein the one or more processors are further configured to determine whether the total insured value of each reinsurable risk is adequately covered by the corresponding reinsurance program.

4. The system of claim 3, wherein in the event that the total insured value of each reinsurable risk is not adequately covered by the corresponding reinsurance program, the one or more processors are further configured to send a notification.

5. The system of claim 3, wherein in the event that the total insured value of each reinsurable risk is not adequately covered by the corresponding reinsurance program, the one or more processors are further configured to put an insurance policy related action on hold.

6. The system of claim 3, wherein in the event that the total insured value of each reinsurable risk is not adequately covered by the corresponding reinsurance program, the one or more processors are further configured to allow an appropriate action to be taken in response.

7. The system of claim 1, wherein the one or more processors are further configured to:
    identify a plurality of the reinsurable risks that is potentially subject to a single loss event; and
    determine a combined total insured value for the identified plurality of reinsurable risks.

8. The system of claim 7, wherein the plurality of reinsurable risks that is potentially subject to a single loss event is identified based on one or more of: effective date, location proximity, shared common risk factor, reinsurance coverage group, and line of business.

9. The system of claim 7, wherein the one or more processors are further configured to determine whether the combined total insured value is adequately covered by a corresponding reinsurance program.

10. The system of claim 9, wherein in the event that the combined total insured value is not adequately covered by the corresponding reinsurance program, the one or more processors are further configured to perform one or more of: sending a notification, putting an insurance policy related action on hold, and allowing an appropriate action to be taken in response.

11. The system of claim 1, wherein the total insured value corresponds to a probable maximum loss.

12. A method for managing risks associated with reinsurance, comprising:
    obtaining a plurality of insurance policies, each of the plurality of insurance policies comprising a plurality of coverages;
    identifying, for each insurance policy in the plurality of insurance policies, a set of coverages that corresponds to a geographical location, a policy level liability, or a covered item; and
    evaluating, using one or more computer processors, for each identified set of coverages, a corresponding reinsurable risk, the evaluation includes determining a total insured value associated with the corresponding reinsurable risk.

13. The method of claim 12, further comprising identifying, for each reinsurable risk, a corresponding reinsurance program that covers the reinsurable risk.

14. The method of claim 13, further comprising determining whether the total insured value of each reinsurable risk is adequately covered by the corresponding reinsurance program.

15. The method of claim 14, wherein in the event that the total insured value of each reinsurable risk is not adequately covered by the corresponding reinsurance program, the method further comprises sending a notification.

16. The method of claim 14, wherein in the event that the total insured value of each reinsurable risk is not adequately covered by the corresponding reinsurance program, the method further comprises putting an insurance policy related action on hold.

17. The method of claim 14, wherein in the event that the total insured value of each reinsurable risk is not adequately covered by the corresponding reinsurance program, the method further comprises allowing an appropriate action to be taken in response.

18. The method of claim 12, further comprising:
    identifying a plurality of the reinsurable risks that is potentially subject to a single loss event; and
    determining a combined total insured value for the identified plurality of reinsurable risks.

19. The method of claim 18, wherein the plurality of reinsurable risks that is potentially subject to a single loss event is identified based on one or more of: effective date, location proximity, shared common risk factor, reinsurance coverage group, and line of business.

20. The method of claim 18, further comprising determining whether the combined total insured value is adequately covered by a corresponding reinsurance program.

21. The method of claim 20, wherein in the event that the combined total insured value is not adequately covered by the corresponding reinsurance program, the method further comprises performing one or more of: sending a notification, putting an insurance policy related action on hold, and allowing an appropriate action to be taken in response.

22. The method of claim 12, wherein the total insured value corresponds to a probable maximum loss.

23. A computer program product for managing risks associated with reinsurance, the computer program product being embodied in a tangible computer readable storage medium and comprising computer instructions for:
    obtaining a plurality of insurance policies, each of the plurality of insurance policies comprising a plurality of coverages;
    identifying, for each insurance policy in the plurality of insurance policies, a set of coverages that corresponds to a geographical location, a policy level liability, or a covered item; and
    evaluating, for each identified set of coverages, a corresponding reinsurable risk, the evaluation includes determining a total insured value associated with the corresponding reinsurable risk.

24. The computer program product of claim 23, further comprising computer instructions for: identifying, for each reinsurable risk, a corresponding reinsurance program that covers the reinsurable risk.

25. The computer program product of claim 23, further comprising computer instructions for:
    identifying a plurality of the reinsurable risks that is potentially subject to a single loss event; and
    determining a combined total insured value for the identified plurality of reinsurable risks.

26. The computer program product of claim 23, wherein the total insured value corresponds to a probable maximum loss.

* * * * *

UNITED STATES PATENT AND TRADEMARK OFFICE
CERTIFICATE OF CORRECTION

PATENT NO. : 8,468,037 B1  
APPLICATION NO. : 13/432788  
DATED : June 18, 2013  
INVENTOR(S) : Clarke et al.

Page 1 of 1

It is certified that error appears in the above-identified patent and that said Letters Patent is hereby corrected as shown below:

Title page item 51, Int. Cl, delete "2006.01" and insert --2012.01--, therefor.

Signed and Sealed this  
Twenty-eighth Day of June, 2016

Michelle K. Lee  
*Director of the United States Patent and Trademark Office*